US009999902B2

United States Patent
Iftime et al.

(10) Patent No.: US 9,999,902 B2
(45) Date of Patent: Jun. 19, 2018

(54) NON-STICKY ERASABLE MEDIA WITH OVERCOAT

(71) Applicant: XEROX CORPORATION, Norwalk, CT (US)

(72) Inventors: Gabriel Iftime, Dublin, CA (US); Jason Leong, Richmond (CA); Edward G. Zwartz, Mississauga (CA); Gordon Sisler, St. Catharines (CA); Kentaro Morimitsu, Mississauga (CA); Adela Goredema, Ancaster (CA); Peter M. Kazmaier, Mississauga (CA)

(73) Assignee: XEROX CORPORATION, Norwalk, CT (US)

(*) Notice: Subject to any disclaimer, the term of this patent is extended or adjusted under 35 U.S.C. 154(b) by 0 days. days.

(21) Appl. No.: 15/331,304

(22) Filed: Oct. 21, 2016

(65) Prior Publication Data
US 2017/0037255 A1    Feb. 9, 2017

Related U.S. Application Data

(62) Division of application No. 12/777,550, filed on May 11, 2010, now Pat. No. 9,507,249.

(51) Int. Cl.
| | |
|---|---|
| *B05D 3/00* | (2006.01) |
| *B41M 7/00* | (2006.01) |
| *D21H 19/80* | (2006.01) |
| *G03C 1/73* | (2006.01) |
| *C09D 5/00* | (2006.01) |
| *C09D 125/14* | (2006.01) |
| *D21H 19/82* | (2006.01) |

(52) U.S. Cl.
CPC .......... *B05D 3/007* (2013.01); *B41M 7/0036* (2013.01); *C09D 5/008* (2013.01); *C09D 125/14* (2013.01); *D21H 19/80* (2013.01); *D21H 19/82* (2013.01); *G03C 1/73* (2013.01); *B05D 2203/22* (2013.01); *B05D 2530/00* (2013.01); *B41M 2205/18* (2013.01); *Y10T 428/254* (2015.01); *Y10T 428/269* (2015.01); *Y10T 428/31786* (2015.04); *Y10T 428/31801* (2015.04); *Y10T 428/31826* (2015.04)

(58) Field of Classification Search
None
See application file for complete search history.

(56) References Cited

U.S. PATENT DOCUMENTS

| | | | |
|---|---|---|---|
| 4,489,108 A | 12/1984 | Postle et al. | |
| 5,360,657 A * | 11/1994 | Kano | ........... B41M 5/5254 428/207 |
| 5,824,399 A | 10/1998 | Denton et al. | |
| 6,010,808 A * | 1/2000 | Naito | ........... B41M 5/281 430/138 |
| 6,423,375 B1 | 7/2002 | Bi et al. | |
| 6,652,959 B2 | 11/2003 | Foucher et al. | |
| 8,216,765 B2 | 7/2012 | Morimitsu et al. | |
| 8,303,858 B2 | 11/2012 | Morimitsu et al. | |

(Continued)

*Primary Examiner* — Michael P Rodriguez
(74) *Attorney, Agent, or Firm* — MH2 Technology Law Group LLP

(57) ABSTRACT

Exemplary embodiments provide an erasable medium having an overcoat layer on a photochromic layer to provide a non-adhesive surface for the erasable medium when exposed to high temperatures, wherein the overcoat layer can include a latex or a mixture of a latex and a wax.

14 Claims, 2 Drawing Sheets

(56) References Cited

U.S. PATENT DOCUMENTS

| | | |
|---|---|---|
| 2002/0143088 A1 | 10/2002 | Robert et al. |
| 2005/0196618 A1 | 9/2005 | Knox et al. |
| 2005/0244742 A1* | 11/2005 | Iftime .................... G03C 1/685 430/270.1 |
| 2005/0287312 A1 | 12/2005 | Bhatt |
| 2006/0083872 A1 | 4/2006 | Sen et al. |
| 2010/0021217 A1 | 1/2010 | Anderson et al. |

* cited by examiner

NON-STICKY ERASABLE MEDIA WITH OVERCOAT

CROSS-REFERENCE TO RELATED APPLICATIONS

This application is a divisional of U.S. patent application Ser. No. 12/777,550 filed May 11, 2010, the disclosure of which is hereby incorporated herein by reference in its entirety.

FIELD OF USE

The present teachings relate generally to erasable media and, more particularly, to non-sticky erasable media having an overcoat.

BACKGROUND

Conventional reusable or erasable media include a polymeric material that may be imaged using radiation energy. The formed images may be erased by application of heat. Conventional methods for applying heat to erase the images from the conventional erasable media include the use of a heated fuser.

In a conventional process, when an imaged erasable paper is fed into a heated fuser assembly for erasing, the paper sheet often adheres to the surface of the fuser roll. This is because the required heating temperature for erasure is significantly higher than the glass transition temperature (Tg) of the polymeric material forming the reusable media. As a result, the heat used for erasing softens the polymeric material, causing the erasable paper to become sticky and adhere to the fuser roll.

The adhering problem may also occur when the erasable media are stored or transported in packs (or in a box) that are exposed to high environmental temperatures. Consequently, paper blocks may be formed, for example, when the erasable media are stored in a warehouse during the summer or when they are shipped on a hot day. In fact, because of the adhesion between paper sheets, severe document offset damage has been found by benchmark sample tests.

Thus, there is a need to overcome these and other problems of the prior art and to provide an erasable medium that can eliminate the adhering problems.

SUMMARY

According to various embodiments, the present teachings include an erasable medium. The erasable medium can include a substrate and a photochromic layer disposed over at least one surface of the substrate. Disposed over the photochromic layer can be an overcoat layer that includes one or more of a latex, a wax and a mixture thereof.

According to various embodiments, the present teachings also include an erasable medium. The erasable medium can include a substrate having a photochromic layer disposed over at least one surface of the substrate. The erasable medium can also include an overcoat layer disposed over the photochromic layer. The overcoat layer can include a mixture of a latex and a wax. The overcoat layer can be non-adhesive at a temperature of more than about 50° C. to at least one of a printing component and a surface layer of a second print medium.

According to various embodiments, the present teachings further include a method for making an erasable medium. In this method, a photochromic layer can be provided on at least one surface of a substrate. A liquid composition that includes at least a latex can be applied to the photochromic layer. The applied liquid composition on the photochromic layer can be solidified to form an overcoat layer on the photochromic layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide an erasable medium having an overcoat layer disposed over a photochromic layer to provide a non-adhesive surface at high temperatures. The photochromic layer can be disposed on at least one surface of a substrate.

Figure 1A:
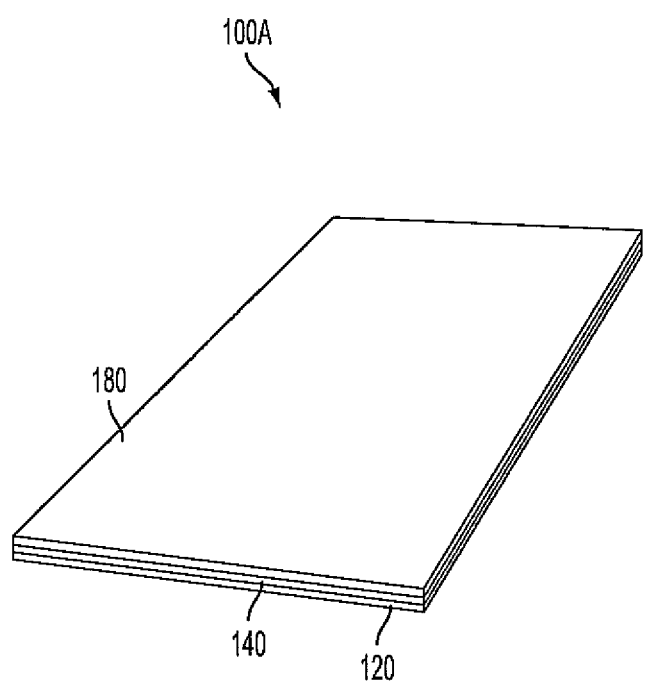
FIG. 1A depicts an exemplary erasable medium having an overcoat layer in accordance with various embodiments of the present teachings.
Figure 1B:
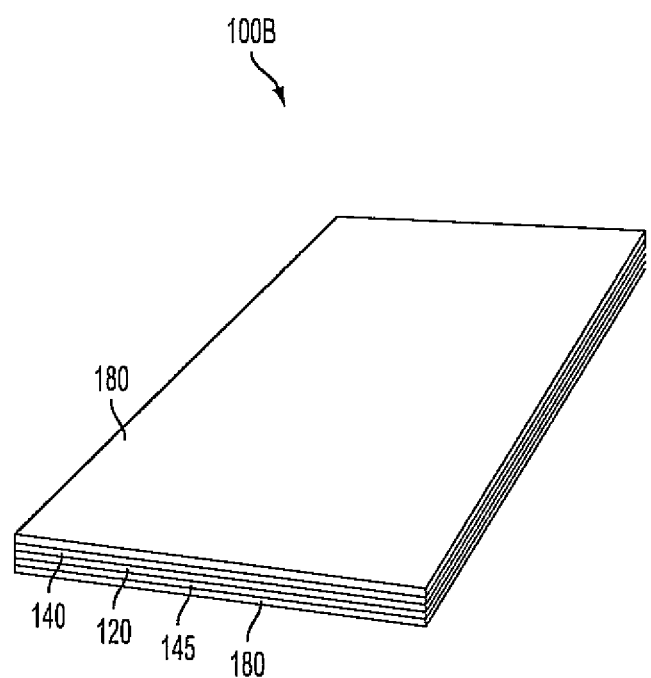
FIG. 1B depicts another exemplary erasable medium having an overcoat layer in accordance with various embodiments of the present teachings.

FIGS. 1A-1B depict exemplary erasable media having an overcoat layer in accordance with various embodiments of the present teachings. It should be readily apparent to one of ordinary skill in the art that the medium 100A, 100B depicted in FIGS. 1A-1B represents a generalized schematic illustration and that other components/layers can be added or existing components/layers can be removed or modified.

As shown in FIG. 1A, the medium 100A can include a photochromic layer 140 disposed over a substrate 120, for example, a one-sided substrate. As shown in FIG. 1B, the erasable medium 100B can further include a second photochromic layer 145 disposed over an opposite surface of the substrate 120, for example, to form a two-sided substrate. In various embodiments, the second photochromic layer 145 and the photochromic layer 140 can be the same or different.

In embodiments, the substrate 120 can be formed of a flexible or a rigid material and can be transparent or opaque.

The substrate 120 can include, for example, any suitable material such as paper, wood, glass, ceramics, plastics, fabrics, textile products, polymeric films, inorganic substrates such as metals, and the like. The paper can include, for example, plain papers such as XEROX® 4024 papers, ruled notebook paper, bond paper, silica coated papers, and the like. The plastic can include clear, translucent, or opaque plastics, for example, a plastic film made of polyethylene, polyethylene terepthalate, polyethylene naphthalate, polystyrene, polycarbonate, or polyethersulfone. In embodiments, the substrate 120, for example a sheet of paper, can have a blank appearance. In embodiments, the substrate 120 can be a single layer or multi-layer where each layer uses the same or different materials. In embodiments, the substrate 120 can have a thickness, for example, ranging from about 0.3 mm to about 5 mm, or from about 0.5 mm to about 4 mm, or from about 1 mm to about 3 mm.

In embodiments, the photochromic layer 140, 145 can be impregnated, embedded or coated to the corresponding surface of the substrate 120. In embodiments, the photochromic layer 140, 145 can include a photochromic material, for example, dispersed in a polymer binder, which can include any suitable polymer binder as known in the art.

In embodiments, any photochromic materials can be used for the photochromic layer 140, 145. Generally, a photochromic material can exhibit photochromism which is a reversible transformation of a chemical species induced in one or both directions by absorption of electromagnetic radiation between two forms having different absorption spectra. For example, the first form can be induced by absorption of radiation energy and/or heated to convert to a second form. The reverse reaction from the second form to the first form can occur, for example, thermally or by absorption of light. In embodiments, the photochromic materials can have reversible transformation of chemical species among three or more forms.

In embodiments, one form of the photochromic material can be colorless or weakly colored, e.g., pale yellow. The other form typically can have a different color, e.g., red, blue, or purple. The reversible transformation between the colorless state and the colored state can be used to print and/or erase images.

In embodiments, the photochromic layer 140, 145 can include one, or more different types of photochromic materials, where the term "type" refers to each family of reversibly interconvertible forms, e.g., spiropyran and its isomer merocyanine collectively forming one type (also referred to as one family) of photochromic material. In embodiments, the photochromic material used for the photochromic layer 140, 145 can be thermochromic, i.e., exhibits thermochromism which is a thermally induced reversible color change.

Examples of suitable photochromic materials can include compounds that undergo heterocyclic cleavage, such as spiropyrans and related compounds; compounds that undergo homocyclic cleavage such as hydrazine and aryl disulfide compounds; compounds that undergo cis-trans isomerization such as azo compounds, stilbene compounds and the like; compounds that undergo proton or group transfer phototautomerism such as photochromic quinines; compounds that undergo photochrom ism via electro transfer such as viologens and the like; and others.

In specific embodiments, the photochromic layer 140, 145 can include a photochromic moiety including, but not limited to, spiropyrans, spirooxazines, chromenes, spirodihydroindolizines, spiroperimidinesazobenzenes, spiroperimidines, azobenzenes, thioindigos, thiospiropyrans, benzos, stilbenes, bisimidazols, quinines, perimidinespirocyclohexadienones, viologens, fulgides, fulgimides, diarylethenes, hydrazines, anils, aryl thiosulfonates, and combinations thereof.

In embodiments, the photochromic layer 140, 145 can include a photochromic composite that contains a photochromic polymer and a polymer binder. The photochromic polymer can have a glass transition temperature ranging from about 30° C. to about 150° C., or from about 30° C. to about 100° C., or from about 55° C. to 80° C. Within the glass transition temperature ranges, the photochromic polymer can undergo the reversible transformation, for example, convert from a colorless state to a colored state. Additionally, the photochromic polymer can include a photochromic moiety covalently bound to a backbone portion of the polymer. The backbone portion and the polymer binder can be similar type polymers having at least one similar functional group. The covalently bound photochromic moiety can include, for example, spiropyrans, spirooxazines, chromenes spirodihydroindolizines, spiroperimidinesazobenzenes, chromenes, thioindigos, thiospiropyrans, benzos, stilbenes, bisimidazols, quinines, perimidinespirocyclohexadienones, viologens, fulgides, fulgimides, diarylethenes, hydrazines, anils, and/or aryl thiosulfonates. In exemplary embodiments, suitable photochromic moieties can be spiropyrans and chromenes.

In embodiments, the photochromic layer 140, 145 can include a photochromic composite as described in a co-pending U.S. patent application Ser. No. 12/627,882, filed Nov. 30, 2009, and entitled "Erasable Media with Binder," the disclosure of which is incorporated herein by reference in its entirety.

In embodiments, as shown in FIGS. 1A-1B, an overcoat layer 180 can be formed over the photochromic layer 140 and/or the photochromic layer 145 in order to prevent the underlying photochromic layer from adhering to other components or other material surfaces at high temperatures. For example, the overcoat layer 180 can provide a "non-adhesive surface" at temperatures greater than or equal to about 40° C. Additionally, the overcoat layer 180 can allow the erasable medium to be imaged, erased, used, stored and/or transported at temperatures of, for example, at least about 50° C., or ranging from about 50° C. to about 80° C., or ranging from about 80° C. to about 200° C., although other temperatures can be included, and wherein the adhering problems known in the art can be eliminated.

In embodiments, the term "non-adhesive" also refers to non-adhesiveness to a printing component including, for example, a fuser member, a pressure member, or any other component used during the imaging, erasure, storage and/or transportation of the disclosed erasable media. In exemplary embodiments, the erasable medium 100A-B can be erased or reused for about 100 times by subjecting to a temperature of about 150° C. and a speed of about 5 ppm without any adhering problem to components contacted.

In embodiments, the term "non-adhesive" further refers to non-adhesiveness to a material surface including, for example, a surface layer of a second print medium. In embodiments, the second print medium can have a surface layer including, for example, one of a second overcoat layer, a second photochromic layer and a second substrate. In embodiments, the second overcoat layer, the second photochromic layer and the second substrate can be the same or different with a corresponding layer of the disclosed erasable media of FIGS. 1A-1B.

In embodiments, the non-adhesive surface of the overcoat layer can have a document offset SIR (standard image reference) mark of at least about 4.0, or ranging from about 4.0 to about 5.0, or ranging from about 4.0 to about 4.5, after the non-adhesive surface of the overcoat layer is pressed with a surface layer of the second print medium. As known in the art, a document offset SIR mark of about 5 indicates no offset damage.

In specific embodiments, the SIR mark can range from about 4.0 to about 4.5 or greater than about 4.5, after stacking the overcoat layer of the disclosed erasable media on a surface layer of a second print medium at a temperature of more than about 50° C., and a pressure ranging from about 60 g/cm² to about 100 g/cm² for example about 80 g/cm², for more than about 24 hours.

In this manner, because of the use of the non-adhesive overcoat layer 180, images can be printed, retained and/or erased at high temperatures without adhering to a heated printing component, for example, a heated fuser member, a heated pressure member, or a similar component. In addition, because of the use of the non-adhesive overcoat layer, generation of blocks of erasable media can be avoided when the erasable media are stored or transported in packs at temperatures higher than, e.g., about 40° C.

In embodiments, the overcoat layer 180 can include one or more materials of a latex, a wax and a combination of a latex and a wax.

In embodiments, the latex can be any suitable latex resin material or known latex resin material including, for example, acrylic, styrene acrylic, rubber, polyesters, sulfonated polyesters, styrene butadienes, and the like polymers, and mixtures thereof. In embodiments, the latex can be copolymers or crosslinked polymers.

In exemplary embodiments, the latex material can be a copolymer including styrene and an acrylic ester. For example, the styrene can include a-methyl styrene, 3-chlorostyrene, 2,5-dichlorostyrene, 4-bromostyrene, 4-tert-butylstyrene, 4-methoxystyrene, vinyl naphthalene, vinyl toluene, divinyl benzene or a combination thereof.

In embodiments, the acrylic ester of the exemplary latex copolymer can have an alkyl group with three or fewer carbon atoms. For example, the acrylic ester can include acrylic esters and methacrylic esters. The acrylic ester can therefore be propyl acrylate, propyl methacrylate, ethyl acrylate, ethyl methacrylate, methyl acrylate, methyl methacrylate or mixtures thereof. In other embodiments, the acrylic ester of the exemplary latex copolymer can be an aromatic acrylic ester. Exemplary aromatic acrylic ester monomers can include benzyl acrylate, phenyl acrylate, phenethyl acrylate, benzyl methacrylate or a combination thereof.

In embodiments, the latex can be present in the overcoat layer 180 in a form of, for example, a latex particle. In embodiments, the latex particle can have an average particle size ranging from about 20 nm to about 500 nm, or from about 50 nm to about 300 nm, or from about 75 nm to about 200 nm, although any suitable latex particles can be used without limitation.

Waxes that can be used include, for example, polyolefins such as polyethylene, polypropylene, and polybutene waxes such as commercially available from Allied Chemical and Petrolite Corporation, for example POLYWAX™ like including POLYWAX® 2000, POLYWAX® 1000, POLYWAX® 500, and the like from Baker Petrolite, Inc.; oxidized waxes such as X-2073 and Mekon waxes, from Baker-Hughes Inc.; polyethylene waxes such as from Baker Petrolite, wax emulsions available from Michaelman, Inc. and the Daniels Products Company, EPOLENE N-15™ commercially available from Eastman Chemical Products, Inc., and VISCOL 550-P™ plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate; and cholesterol higher fatty acid ester waxes, such as cholesteryl stearate.

Examples of functionalized waxes that may be used include amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™ and 538™, all available from SC Johnson Wax, and chlorinated polypropylenes and polyethylenes available from Allied Chemical and Petrolite Corporation and SC Johnson wax; and combinations thereof.

In embodiments, the wax used for the overcoat layer 180 can have a molecular weight ranging from about 500 to about 20,000, or from about 1,000 to about 10,000, or from about 1,500 to about 10,000. In embodiments, the wax can be in a form of fine particles having a particle size of less than about 500 nm, or ranging from about 50 nm to about 300 nm, or from about 75 nm to about 200 nm.

In embodiments, a liquid-based coating process can be used to form the overcoat layer 180. For example, the overcoat layer 180 can be formed by first applying a liquid overcoat composition to the photochromic layer 140 and/or 145, followed by a solidifying process, e.g., a drying and/or heating process, of the liquid overcoat composition to form the overcoat layer. In embodiments, the formed overcoat layer 180 can have a thickness of at least 0.01 microns, or ranging from about 0.01 microns to about 100 microns, or ranging from about 0.5 microns to about 30 microns.

In embodiments, the liquid overcoat composition can be waterborne and can include a latex emulsion, a wax emulsion and/or a combination thereof.

In exemplary embodiments, the latex emulsion or latex waterborne can include, for example, acrylic-based copolymer latex such as styrenated acrylic copolymer latex, supplied from Kelstar International (Cinnaminson, N.J., USA) having a Trade name of AQ-3025 (aqueous satin coating). In embodiments, the acrylic-based copolymer latex can be silicon free, organic solvent free, amine neutralized acrylic resin in water. In embodiments, the latex emulsion can further include, for example, a surfactant, and other suitable particles or materials.

In one embodiment, the liquid overcoat composition can include only a latex emulsion to form the overcoat layer 180, wherein exemplary latex particles can be present in an amount of at least about 0.1%, or ranging from about 0.1% to about 90%, or ranging from about 10% to about 50% by weight of the total liquid overcoat composition.

In another embodiment, the overcoat layer 180 can be formed from a liquid overcoat composition that includes a mixture of the above disclosed latex emulsion with a wax emulsion.

In exemplary embodiments, the wax emulsion can be a waterborne wax emulsion including a wax of, for example, paraffin, microcrystalline wax, and/or atactic polypropylene and polyolefin, supplied from IGI Wax (Titusville, Pa.). Other suitable additives or materials as known to one of ordinary skill in the art can also be included in the wax emulsion.

In embodiments, the liquid overcoat composition can be prepared to have a wax/latex ratio. For example, wax can be present in an amount ranging from about 0.5% to about 70%, or ranging from about 5% to about 60%, or ranging from about 10% to about 50% by weight of the latex present in the liquid overcoat composition and therefore in the resulting overcoat layer 180.

Referring back to FIGS. 1A-1B, the overcoat layer 180 can protect the underlying photochromic layer from adhering to other components or other material surfaces at high temperatures as disclosed herein, while the underlying photochromic layer can maintain its photochromic properties.

For example, the underlying photochromic layer 140, 145 can convert from a colorless state to a colored state using a radiant energy having a wavelength from about 200 nm to about 475 nm and/or a temperature ranging from about 40° C. to about 120° C.; or ranging from about 50° C. to about 90° C., or ranging from about 60° C. to about 80° C. The underlying photochromic layer can revert from a colored state to a colorless state at a temperature of about 70° C. or higher, or ranging from about 80° C. to about 200° C., or ranging from about 90° C. to about 100° C.

In embodiments, the underlying photochromic layer 140, 145 can be imaged to have an initial optical density difference ($\Delta OD$) between an image and a background area of the photochromic layer of at least about 0.70, or at least about 0.75, or at least about 0.8. In embodiments, after 3 days from initializing the imaging process, the underlying photochromic layer 140, 145 can retain the printed visible image having a $\Delta OD$ of at least about 40%, or at least about 50% or at least about 60% of the initial $\Delta OD$ under environmental light or a 400 lux light.

In embodiments, the underlying photochromic layer 140, 145 can retain the visible image for at least about 24 hours, or at least about 2 days, or at least about 3 days under environmental light or a 400 lux light.

In certain embodiments, the underlying photochromic layer 140, 145 can be erased or reused for more than about 100 times. For example, the disclosed erasable media can pass through a fuser assembly at a temperature of about 150° C. and a speed of about 5 ppm. No adherence to the fuser member or to the pressure member of the fuser assembly will occur, due to use of the overcoat layer 180. Additionally, the overcoat layer 180 can prevent the disclosed erasable media from adhering each other at a temperature of, for example, greater than about 50° C.

EXAMPLES

Example 1: Fabrication of Overcoated Erasable Paper

To form an exemplary erasable paper, a photochromic layer was first applied to a paper substrate from a liquid composition made out of a photochromic polymer and a polymer binder in toluene, and was then dried overnight at room temperature. The materials and methods for forming this exemplary photochromic layer on a substrate were also disclosed in a co-pending U.S. patent application Ser. No. 12/627,882, filed Nov. 30, 2009, and entitled "Erasable Media with Binder," the disclosure of which is incorporated herein by reference in its entirety.

In some examples, the photochromic layer was applied on one side of the paper substrate. In other examples, the photochromic layer was applied on both sides of the paper substrate.

A latex emulsion or a latex/wax emulsion composition was then coated on each photochromic layer using standard liquid-based coating process. The latex emulsion included styrenated acrylic copolymer latex, supplied from Kelstar International (Cinnaminson, N.J., USA) having a Trade name of AQ-3025 (aqueous satin coating). The liquid composition that includes both latex and wax had a latex/wax/water ratio of about 9/1/1 by weight and was made by mixing the latex emulsion with a waterborne wax emulsion obtained from IGI Wax (Titusville, Pa.).

Each liquid composition, i.e., the latex emulsion or the latex/wax emulsion composition, was manually coated with a Mathis Lab Coater (Palmer, Pa.) using a rod. Each coated composition was then dried at a temperature of about 100° C. for about 5 minutes, to form the exemplary overcoated erasable medium.

Example 2: Image Test Results

Table 1 shows comparative image test results for three sets of samples including: (1) Sample A of conventional erasable paper used as a control for the disclosed exemplary erasable media of Sample B and Sample C; (2) Sample B having a protection layer of a clear latex overcoat on the photochromic layer of Sample A; and (3) Sample C having a protection layer of a latex/wax overcoat containing the same latex used for Sample B and the wax obtained from IGI on Sample A.

TABLE 1

| Sample | | $\Delta OD$ (t = 0) (Target > 0.75) | SD (t = 0) | $\Delta OD$ (t = 3 days) (Target > 0.42) | SD (t = 3 days) |
|---|---|---|---|---|---|
| A | No overcoat | 0.81 | 0.012 | 0.60 | 0.004 |
| B | Latex overcoat | 0.76 | 0.024 | 0.56 | 0.012 |
| C | Latex/Wax (9:1) overcoat | 0.72 | 0.008 | 0.55 | 0.010 |

Comparison between Samples A, B and C in Table 1 shows that the exemplary photochromic layer of Samples B and C maintained its photochromic properties, i.e., having desirable writability and image lifetime, when the disclosed overcoat layer was formed thereon.

Example 3: Paper-to-Fuser Adhesion Test

Samples A, B and C in Examples 1-2 were then tested by feeding them through an IMARI fuser assembly at a temperature of about 150° C. and a speed of about 5 ppm, mimicking an erasing condition.

For Sample A, the conventional erasable paper having a photochromic layer disposed on a paper sheet, a full adhesion was observed between Sample A and the fuser roll. Additionally, it was difficult to remove the adhered Sample A from the fuser roll without completely damaging the sample. Further, the cleaning of the fuser roll having the adhered polymer composition from Sample A was a long and tedious process. Further more, a large number of sheets of Sample A were tested and all showed the same results of having a strong adhesion to the fuser rolls.

SIR mark of 5 indicates that the sample is not damaged and does not adhere; an SIR mark of 4.5 indicates no document damage but having sticky prints; and an SIR mark of 1 indicates significant amount of document damage. An SIR mark of 0 indicates that the sheet adhered and tore when peeled. Table 2 summarizes the paper-to-paper adhesion test results of various test samples as described herein.

TABLE 2

|  | Sample | Document Offset (Coated to Coated) | Document offset (Coated to uncoated) | Comments |
| --- | --- | --- | --- | --- |
| Standard Toner | iGen3 Toner (On DCEG paper) | 0.50 (@60° C.)<br>4.25 (@50° C.) | 1.0 (@60° C.)<br>4.50 (@50° C.) |  |
| A | RUP unprotected (no overcoat) | 0 (@60° C.)<br>0 (@50° C.) | 0 (@60° C.) cannot be peeled<br>3.50 (@50° C.) apart |  |
| B | RUP latex overcoat | 3.00 (@60° C.)<br>4.00 (@50° C.) | 4.50 (@60° C.)<br>4.50 (@50° C.) |  |
| C | RUP latex/wax overcoat | 4.50 (@60° C.)<br>Not Tested (@50° C.) | 4.50 (@60° C.)<br>Not Tested (@50° C.) | Already OK @60° C. |

For Sample B, having a clear latex overcoat on the conventional erasable paper Sample A, the adhesion between Sample B and the fuser roll was observed to be less than the adhesion between Sample A and the fuser roll. As observed, the latex overcoat facilitated some sheets of Sample B to pass through the fuser roll and its counter roll, e.g., the pressure roll. Other sheets, however, were adhered to the fuser roll and/or to the pressure roll.

For Sample C, having a latex/wax overcoat on conventional erasable paper Sample A, all tested samples of Sample C were observed to pass through the fuser roll and its counter roll without adhering to any roll surface, under required erasing conditions. Additionally, small size medium such as letter size paper sheets of Sample C were tested many times using these erasing conditions. Desirable erasure results were obtained and no adhesion to the roll surface was observed. Further, letter size Sample C sheet was observed passing the fuser roll for about 100 times or more without adhering to the surface of the fuser roll, indicating erasure reproducibility. A target number of reuses for conventional erasable paper can be about 10 times.

Example 4: Paper-to-Paper Adhesion Test
(Document Offset Test)

Document Offset Test was used to measure Samples A, B and C using Xerox standard testing techniques. Test samples were prepared by placing two pieces of paper sheets together, either coated face (i.e., with the overcoat layer) to coated face or coated face to uncoated face (i.e., with a photochromic layer or a paper substrate). Each piece of the sample sheets was cut to about 2"×2". A glass slide was placed on top of the test samples after which a pressure of about 80.0 g/cm$^2$ was applied. The test samples with glass slide thereon were then held for about twenty-four hours at set temperatures of about 60° C. and about 50° C. in an environment having a humidity of about 50%.

The samples were then cooled to room temperature, before the sections of test sheets were peeled apart at a constant rate and at a peel angle of about 180°. For example, the test sheet was placed against a flat surface with one edge lifted up and then peeled back.

Offset damage was evaluated by document offset SIR method (Standard Image Reference). As known in the art, an As shown in Table 2, Sample C protected by a latex/wax overcoat had an SIR mark of around 4.25-4.50 after exposure to a temperature of about 60° C., indicating excellent non-blocking (non-adhesion) performance of the latex/wax coated samples.

As further shown in Table 2, conventional erasable paper sheets, i.e., Sample A having no overcoat layer, adhered permanently to both a coated surface and an uncoated surface at a temperature of about 60° C. This resulted in an SIR mark of 0.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for making an erasable medium comprising:
providing a photochromic layer on at least one surface of a substrate;
applying a liquid composition to the photochromic layer, wherein the liquid composition comprises a latex and a wax, the wax being in the form of a wax emulsion, the latex comprising a polymer selected from the group consisting of acrylate polymer, styrene acrylate polymer, rubber, polyester, sulfonated polyester, styrene butadiene polymer, and mixtures thereof; and
solidifying the applied liquid composition on the photochromic layer to form an overcoat layer.

2. The method of claim 1, wherein the liquid composition comprises a ratio of latex/wax/water of about 9/1/1.

3. The method of claim 1, wherein the overcoat layer has a thickness ranging from about 0.1 microns to about 30 microns.

4. The method of claim 1, wherein the latex comprises a polymer selected from the group consisting of acrylate polymer, styrene acrylate polymer, rubber, polyester, sulfonated polyester and mixtures thereof.

5. The method of claim 1, wherein the latex is in a form of a particle having an average particle size ranging from about 50 nm to about 200 nm.

6. The method of claim 1, wherein the wax is a material selected from the group consisting of polyethylene, polypropylene, polyethylene copolymer, Fischer-Tropsch waxes, oxidized waxes, plant based waxes, animal based waxes, petroleum based waxes, ester waxes obtained from higher fatty acid and higher alcohols, ester waxes obtained from higher fatty acid and monovalent or multivalent lower alcohol, ester waxes obtained from higher fatty acid and multivalent alcohol multimers, sorbitan higher fatty acid ester waxes, cholesterol higher fatty acid ester waxes, functionalized waxes comprising amine, amide, fluorinated or chlorinated waxes, mixed fluorinated amide waxes, imides, esters, quaternary amines, carboxylic acids or acrylic functionalized waxes, and combinations thereof.

7. The method of claim 1, wherein the overcoat layer comprises wax in an amount ranging from about 10% to about 20%, based on the weight of the latex.

8. The method of claim 1, wherein the photochromic layer comprises a photochromic moiety selected from the group consisting of spiropyrans, spirooxazines, chromenes, spirodihydroindolizines, spiroperimidines, azobenzenes, thioindigos, thiospiropyrans, benzos, stilbenes, bisimidazols, quinines, perimidinespirocyclohexadienones, viologens, fulgides, fulgim ides, diarylethenes, hydrazines, anils, aryl thiosulfonates, and combinations thereof.

9. The method of claim 1, wherein the photochromic layer comprises a photochromic composite comprising:
a photochromic polymer comprising a photochromic moiety covalently bound to a backbone portion, wherein the photochromic polymer has a glass transition temperature ranging from about 30° C. to about 150° C.; and
a polymer binder, wherein the polymer binder and the backbone portion of the photochromic polymer each comprises at least one similar functional group.

10. The method of claim 1, wherein the underlying photochromic layer converts from a colorless state to a colored state using a radiant energy having a wavelength from about 200 nm to about 475 nm and at a temperature ranging from about 30° C. to about 150° C.; and reverts from a colored state to a colorless state at a temperature of about 70° C. or higher.

11. The method of claim 1, wherein the latex comprises styrene acrylate polymer.

12. The method of claim 1, wherein the wax is a material selected from the group consisting of polypropylene, Fischer-Tropsch waxes, oxidized waxes, plant based waxes, animal based waxes, ester waxes obtained from higher fatty acid and higher alcohols, ester waxes obtained from higher fatty acid and monovalent or multivalent lower alcohol, ester waxes obtained from higher fatty acid and multivalent alcohol multimers, sorbitan higher fatty acid ester waxes, cholesterol higher fatty acid ester waxes, functionalized waxes comprising amine, amide, fluorinated or chlorinated waxes, mixed fluorinated amide waxes, imides, esters, quaternary amines, carboxylic acids or acrylic functionalized waxes, and combinations thereof.

13. The method of claim 12, wherein the latex comprises styrene acrylate polymer.

14. The method of claim 13, wherein the wax comprises atactic polypropylene and other polyolefins.

* * * * *